March 20, 1962  H. A. ANDRESEN ET AL  3,026,114
ROTARY FACE SEAL DEVICE WITH FLUID DIRECTOR
Filed May 21, 1957  2 Sheets-Sheet 1

Inventor
Hilmar A. Andresen
Raymond H. Andresen

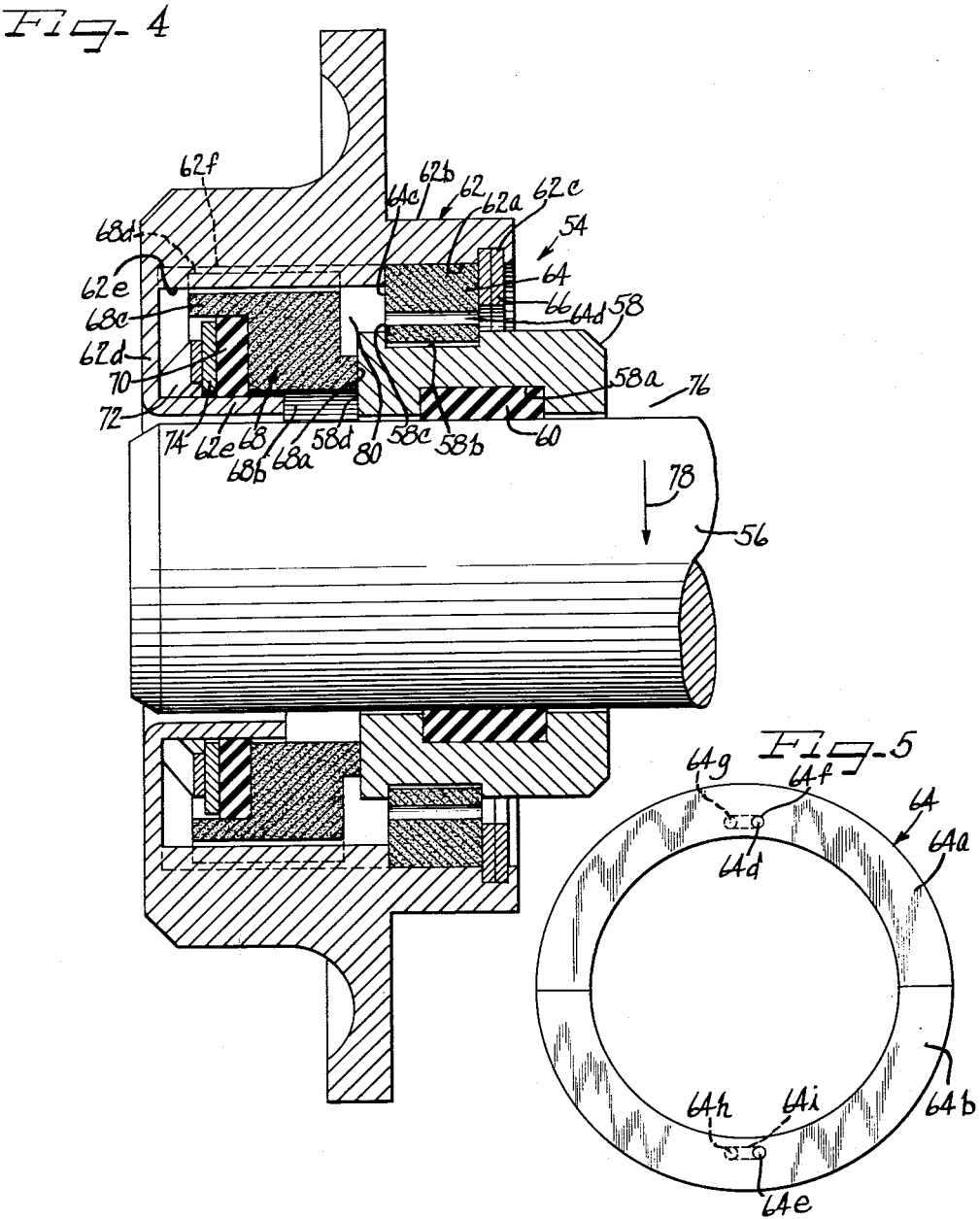

United States Patent Office 3,026,114
Patented Mar. 20, 1962

3,026,114
ROTARY FACE SEAL DEVICE WITH FLUID DIRECTOR
Hilmar A. Andresen and Raymond H. Andresen, Barrington, Ill., assignors to Remi J. Gits, Jr., Hinsdale, Ill., Edward W. Gits, La Grange, Ill., and Mercantile National Bank of Chicago, Chicago, Ill., a National Banking Association, as co-trustees
Filed May 21, 1957, Ser. No. 660,609
1 Claim. (Cl. 277—68)

The present invention relates to improvements in fluid seals for relatively rotating members, and especially relates to a seal unit which is adapted to be installed on a rotating shaft or the like and which is not dependent on the accuracy of the bearing supporting the surface and will compensate automatically for axial movements of the rotating shaft insuring the prevention of the breakage of the seal from axial movement.

An object of the invention is to provide a rotary seal having a first sealing part that rotates and a second sealing part which is fixed wherein the parts have axially facing mating sealing surfaces which are maintained in sealing relationship by axial movement of the fixed part and wherein the axial movement provided may be maintained at a minimum, and a long movement need not be provided to compensate for dimensional tolerances in the mechanism being served.

Another object of the invention is to provide a seal for a rotating shaft or the like wherein the seal function need not be dependent upon the accuracy of the bearings provided for the shaft which the seal is to serve.

A further object of the invention is to provide a rotary seal which may be manufactured and assembled as a complete unit to be supplied without additional parts for installation on a rotating shaft, thereby enabling control of manufacturing tolerances.

Another object of the invention is to provide a complete unitary seal for installation on a rotating shaft without the provision of additional parts whereby the seal is self-adjusting and all of the moving parts are contained in the single unit, and manufacturing tolerances can be accommodated within the unit without taking into consideration tolerances in the shaft and support bearing assembly.

Another object of the invention is to provide a shaft seal which is exceedingly well adapted to use with shafts that operate at extreme high speeds and are susceptible to vibration and shock.

An important object of the invention is to provide a shaft seal wherein the seal is not affected by change in axial location of the shaft, such as occurs with heat growth, bearing wear, and such as is aggravated by a stackup of parts and compounding of dimensional inaccuracies.

A still further object of the invention is to provide a rotary seal having rotationally relatively moving parts wherein each part is stabilized with respect to its mating part.

Other objects and advantages will become more apparent with the teachings of the principles of the invention in connection with the disclosure of the preferred embodiments thereof in the specification, claim and drawings, in which:

FIGURE 4 is a sectional view taken through the axis of a shaft illustrating another form of the seal embodying the principles of the present invention; and, FIGURE 5 is a detailed end elevational view of the thrust bearing of the embodiment of FIGURE 4 illustrating the manner of forming the fluid transfer passageways for lubricating and cooling the bearing.

Although the invention is disclosed in its preferred forms as used for forming a rotational seal on a rotating shaft, it will be understood that the features and principles of the invention may be utilized in other environments taking advantage of their inherent features.

Figure 1:
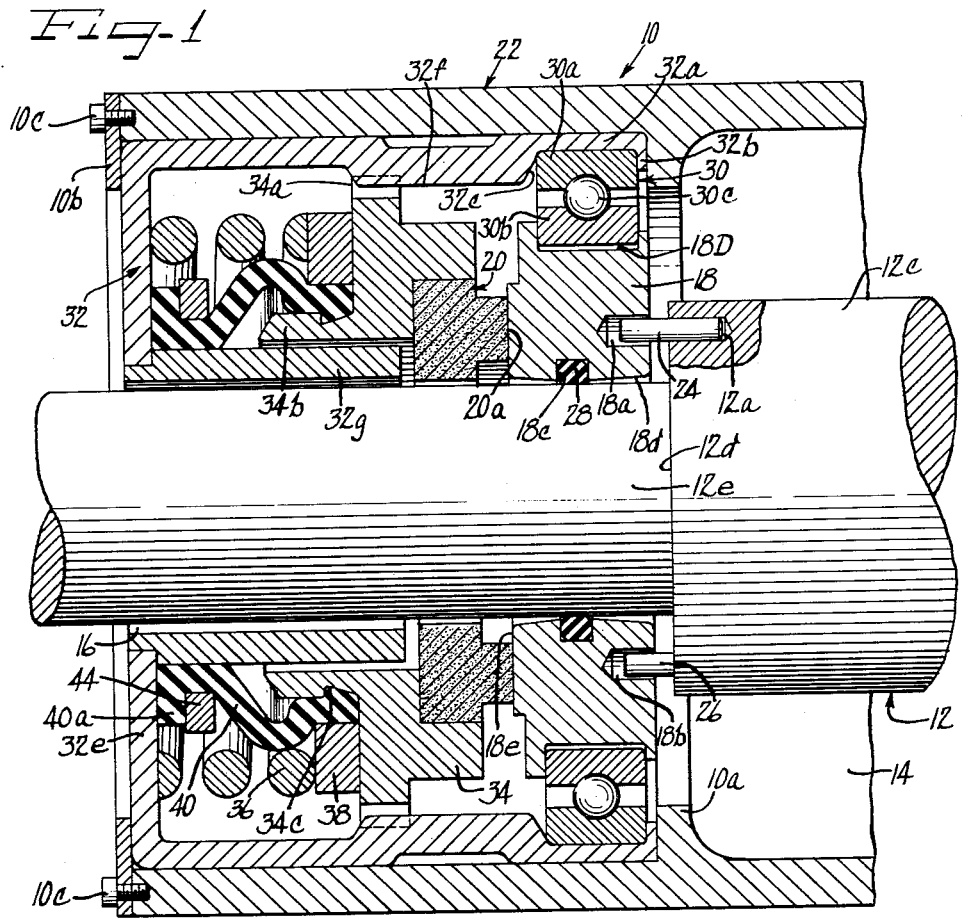
FIGURE 1 is a sectional view taken through the axis of a shaft illustrating the sealing assembly in place.

As shown in FIGURE 1, the seal 10 is employed with a rotating shaft 12, which passes through an area to be separated into a first zone 14, and a second zone 16, with the seal isolating the zones and preventing fluid flow therebetween. For example, zone 14, may be a high pressure zone with 16 a low pressure zone and a liquid or gas may be present in the zone 14 to be prevented from flowing to the zone 16. As will be recognized by those skilled in the art, the provision of an unfailing seal is of major importance in many operational circumstances. An example of an application is in a fluid pump wherein inflammable materials are to be handled, and leakage of the fluid may cause a conflagration or endanger operating personnel. The consistent safe leakage preventing operation of the seal is essential to successful pump operation.

Figures 2, 3:
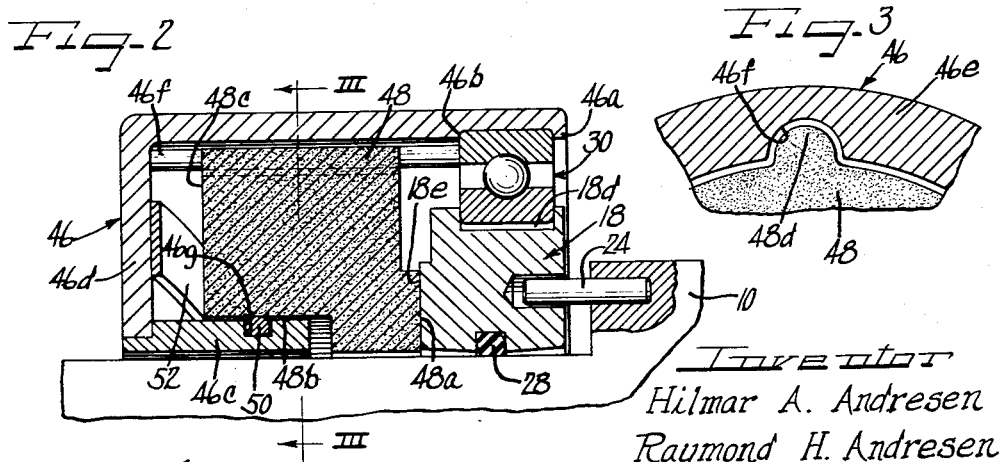
FIGURE 2 is a sectional view of a portion of the seal illustrating the invention in another form.
FIGURE 3 is an enlarged fragmentary sectional view taken along line III—III of FIGURE 2.

The sealing assembly in the form shown in FIGURES 1, 2 and 4 is provided as a unit and is assembled to the shaft, such as 12 in FIGURE 1, by insertion over the end of the shaft. The seal assembly includes a sealing ring 18 which rotates with the shaft 12 and engages a co-acting cooperating sealing member or wearing member 20. The sealing ring 18 and the wearing member 20, which provide a seal between them, and their operating elements are carried as a unit within the housing 22, which is shown in the form of a tube.

The sealing ring 18 is rotationally driven by the shaft and for this purpose has a series of axially facing openings such as 18a and 18b, which receive drive pins 24 and 26. The drive pins are smaller than the openings 18a and 18b and permit a degree of movement in the radial direction of the sealing ring. The drive pins are also arranged so as to not be fully inserted into the openings 18a and 18b so as to permit freedom of axial movement of the sealing ring. The drive pins are supported in openings 12a of the shaft 12. For carrying the drive pins the shaft 12 has an enlarged portion 12c providing an axially facing annular shoulder 12d, which faces the seal and which provides a surface in which the holes 12a may be drilled.

Flow of fluid along the shaft 12 is prevented by a flexible resilient wear-enduring fluid barrier member 28, which may be in the form of an O-ring located within an annular groove 18c of the sealing ring 18. The inner annular surface 18d of the sealing ring has a diameter slightly larger than the diameter of the main portion 12e of the shaft so that there will be no surface contact between the rigid sealing ring 18 and the rigid shaft. This permits some radial movement between the sealing ring and the shaft and the fluid seal is not broken, but is maintained by the O-ring 28. Although the sealing ring has freedom of radial movement, the radial movements are ultimately limited by the resiliency of the O-ring 28, so that small vibrational movements of the shaft are absorbed during running, but the sealing ring 18 is substantially coaxial and generally fixed in coaxial relationship during operation to the shaft 12.

The sealing ring 18 is held against axial movement by a thrust bearing 30. The thrust bearing is supported and fixed so as to be substantially coaxial with the shaft within the outer tubular portion 32a of the carrier holder 32. The carrier has an inwardly turned flange 32b at its end to hold the bearing against a shoulder 32c. The bearing is shown as being of the ball bearing type with an outer race 30a and inner race 30b, with ball bearings 30c therebetween. The sealing ring 18 has an outwardly facing rectangular groove 18d which holds the ring with respect to the thrust bearing 30. The groove is deeper than necessary, so as to provide a gap and permit radial movement of the sealing ring 18 with respect to the bearing. Thus, the thrust bearing 30 stabilizes the axial position of the sealing ring 18.

The wearing ring 20 has a smooth annular axially facing sealing surface 20a, which is in coacting sealing relationship with the smooth axial facing annular sealing surface 18e of the sealing ring. The wearing ring 20 is supported in a carrier ring 34 which axially holds the wearing ring 20 against the sealing ring and supports it in a radial direction coaxial with the shaft 12.

The carrier ring 34 is urged toward the sealing ring by a coil compression spring 36. The coil compression spring 36 extends between the end or base 32e of the carrier 32 and a boot holding ring 38 in order to urge the wearing ring 20 toward the sealing ring.

The wearing ring 20 is held against rotational movement within the carrier 32 by having radially extending teeth 34a which extend into grooves provided by inwardly forced ridges 32f in the outer tube 32a of the carrier.

The carrier ring 34 has a telescoping portion 34b which is in telescoping relationship with the inner portion 32g of the carrier holder 32. A sealing boot 40 is positioned against the outer surfaces of the telescoping portions 34b and 32g to prevent the leakage of fluid from the high pressure zone 14 to the low pressure zone 16. The boot 40 is substantially tubular in shape and at one end is forced into a notch 34c and held therein by the boot holding ring 38. At the other end, the boot is held to the outer surface of the tubular portion 32g by a boot holding ring 44 and the boot is shaped with an outwardly extending annular flanged portion 40a which projects outwardly behind the ring 44.

Thus, all of the aforedescribed sealing elements, the sealing ring 18 with its thrust bearing 30, the wearing ring 20 with its carrier ring 34 and wear compensating spring 36 and sealing boot 40, are all supported on carrier 32. The sealing ring 18 finds some radial support on the shaft but is carried in an axial direction on the carrier 32. The carrier, with its supported elements, is thus an independent unit which determines the spacing and positional relationship of the sealing elements. The unit can be inserted over the end of the shaft 12 as a whole, and axial movement of the shaft will not affect the positional relationship of the sealing parts. The tolerances which must be maintained for proper operation of the sealing parts are all dependent upon the manufacture and assembly of the carrier 32 and its parts, and complete control of these parts can be had by one manufacturer without concern with the shaft variations which may be caused by axial dimensional tolerances during manufacture, or axial movement during operation of the shaft for which the seal is provided.

The carrier with its sealing parts is assembled by slipping over the end of the shaft of the appropriate diameter and the carrier will fit snugly within the tubular housing 10. The depth of insertion is limited by the forward flange 32a striking an inwardly extending flange 10a within the tubular housing 10 and the carrier is held in place by an annular holding ring 10b, which is secured to the end of the tube 10 by bolts 10c.

In the form shown in FIGURE 2, the seal assembly for the shaft 10 includes the sealing ring 18 slid over the end of the shaft and sealed thereto in fluid-tight relationship by the resilient O-ring 28, and driven rotationally by the driving pins 24.

The sealing ring is axially located and stabilized by the thrust bearing 30, which extends into the notch 18d in the sealing ring.

A carrier 46 acts as a unitary axial support for stabilizing the axial position of the parts and has an inwardly turned flange 46a at its end, which with an opposing shoulder 46b defines a groove for holding the thrust bearing 30.

In the form of FIGURE 2, the wearing ring is formed of a singular unitary element. A wearing ring 48 is provided having a sealing surface 48a which faces axially and mates with the sealing surface 18e of the sealing ring. The wearing ring 48 has an annularly inwardly facing surface 48b, which telescopes over the tubular portion 46c of the carrier 46 so as to permit the wearing ring to move forward as its wearing surface 48a becomes worn. A resilient O-ring 50 is located between the surface 48b and the surface of the telescoping part 46c and is seated in a groove 46g in the part 46c.

The wearing ring 48 is maintained in sealing relationship with the sealing ring 18 by a wave spring 52, which urges it to sealing relationship with the sealing ring 18. The wave spring 52 is located between the base 46d and the surface 48c of the wearing ring.

As may be seen in FIGURES 2 and 3, an outer tubular portion 46e of the carrier 46 is provided with grooves, such as 46f, which extend axially and into which project ribs or teeth 48d of the wearing ring. This prevents the wearing ring from rotating and holds it rotationally stationary with respect to the rotatable sealing ring 18.

In the embodiment of FIGURE 4, the sealing assembly 54 is shown used with a shaft 56. The shaft 56 may be of uniform diameter and in assembly, the sealing ring 58 is slid over the end of the shaft 56. The sealing ring 58 is driven in rotation by the shaft 56 by frictional contact with the resilient flexible vibration assimilating band 60. The band fits tightly around the circumference of the shaft 56 to prevent the flow of fluid therealong. The band is rectangular in cross section and is carried in a rectangular groove 58a in the sealing ring 58. The band 60 prevents the flow of fluid along the shaft and substantially fixes the radial position of the sealing ring 58, but permits vibrations of the shaft and shocks to be assimilated, and not directly transmitted to the sealing ring 58. The band also permits axial movement of the shaft, such as caused by heat growth, bearing wear and the like, and the position of the wearing ring 58 is fixed by a bearing 64 on a carrier 62 which stabilizes the mating parts of the sealing assembly.

The carrier 62 carries the annular thrust bearing ring 64 which is shown in the form of a long wearing material, such as carbon. As shown in FIGURE 5, the thrust bearing 64 is split in order that the parts 64a and 64b may be dropped into the notch 58b in the sealing ring 58. The sections of the carbon ring are of a size so that the bearing ring 64 fits snugly into the rectangular groove 64a in the outer tubular portion 62b of the carrier 62. This provides a slight gap at the base of the groove 58b in the sealing ring 58 so that small radial movement of the sealing ring shaft may freely occur. The carbon thrust bearing is locked in place in the carrier 62 by a spiral locking ring 66 which is of the expansible type and which locks outwardly in the groove 62c of the carrier.

It will thus be seen that the thrust bearing 64 has an axially facing wear surface 64c which is engaged by the annular side 58c of the groove 58b in the sealing ring, thus preventing the sealing ring from shifting axially and fixing the position of the sealing ring with respect to the carrier 62.

The sealing ring 58 has an axially facing annular smooth sealing surface 58d against which slides an axially facing annular sealing surface 68a of the wearing ring 68. The wearing ring may be of carbon or some like material which provides a seal against the sealing ring 58 and which has a low coefficient of friction therewith and which will wear more rapidly than the sealing ring.

The inner surface 68b of the wearing ring is in telescopic relationship to the inner tubular portion 62e of the carrier 62. The wearing ring is provided with an annular flange 68c, which is in telescopic relation to the cylindrical surface 62c. A seal such as a packing ring 70 is located between the inner surface of the annular flange 68c and the outer surface of the tubular portion 62e.

The wearing ring 68 is urged to continual sealing relationship with the sealing ring 58 by a flat wave spring 72 which bears against a flat washer 74, and the wave spring 72 and the flat washer 74 are located between the packing 70 and the end 62d of the carrier 62.

The outer circumferential surface of the wearing ring 68 is provided with axially extending ribs 68d, which project into grooves 68f in the carrier to hold the wearing ring against rotational movement.

Means are provided to insure that a flow of fluid surrounding the shaft in the high pressure zone 76 will continue to flow to the area of the sealing surfaces 58b and 68a, thus insuring continued lubrication and continued cooling of the wearing rubbing surfaces.

For this purpose, fluid flow passageways, such as 64d and 64e are provided. Passageway 64d is inclined with respect to a plane passing through the axis of a shaft 56 and the direction of rotation of the shaft is indicated by the arrow 78. The fluid surrounding the shaft surrounding the sealing ring 58 will tend to circulate in the direction of rotation of the shaft by frictional engagement with the shaft. Thus, the fluid will enter the end 64f, FIGURE 5, of the passageway 64d and move through the passageway escaping through the end 64g to enter the zone shown at 80, FIGURE 4, which is in the proximity of the sealing surfaces 58d and 60a of the sealing ring 58 in the wearing ring 68.

The passageway 64 on the other side of the sealing ring is inclined in the opposite direction to passageway 64b, i.e. in a direction opposite to the rotation of the shaft 56, as indicated by the arrow 78. This will tend to pump the fluid out of the zone 80 through the passageway 64e from the end 64h to the end 64i. Thus, a continual flow of fluid will be caused from the zone 76 to the zone 80 through the passageway 64d and from the zone 80 to the zone 76 through the passageway 64e. This continually pumped flow of fluid will provide lubrication and cooling on the sealing surfaces.

Although the operation of the mechanism will be clear from the description of the structure and function of the individual elements, a brief summary of operation will be helpful in reviewing the objectives and advantages of the invention. As illustrated in FIGURE 1, the sealing unit 10 is provided as a unit assembly to be slipped over the end of the shaft 12. The sealing ring 18 is slipped over the end of the smaller end 12e of the shaft and is held coaxially therewith by a resilient O-ring 28 which prevents the escape of fluid along the shaft. Vibrations and shocks of the shaft are assimilated by the resilient O-ring 28 and the sealing ring 18 is axially positioned by the thrust bearing 30 which is held in place by the outer tubular portion 32a of the carrier 32. The sealing ring 18 rotates with the shaft, and the cooperating sealing member which is in the form of a wearing ring 20, is held stationary and supported within the carrier ring 34. The carrier ring 34 and wearing ring 20 are urged to sealing relationship against the surface 18e of the sealing ring 18 by the compression spring 36. The spring 36 moves the wearing ring 20 forwardly only to compensate for the wear which occurs in the leading face 20g of the wearing ring, and only a limited travel need be provided, since axial movement of the shaft 12 will not make any difference in the positional relationship of the sealing members 18 and 20.

In the form of FIGURE 4, the thrust bearing is shown in the form of a carbon ring 64, which is provided with fluid pumping passageways 64d and 64e to maintain a constant flow of cooling and lubricating fluid to the wearing surfaces.

Thus, it will be seen that we have provided an improved self-contained unitary seal assembly, which meets the objectives and advantages hereinbefore set forth. The mechanism is manufactured and assembled as a unit and manufacturing tolerances, relationship of parts, cleanliness and other factors can be controlled directly in the manufacture of the unit, and the entity can be combined with a shaft to be sealed without adjustment.

The seal is self-adjusting for wear and since the self-adjusting feature does not have to compensate for variation in shaft movement, improved sealing can be obtained. Also, the mating sealing parts are completely stabilized with respect to a single fixed part, and vibrations and shocks are assimilated, and the unit is, therefore, well adapted to operation under adverse circumstances such as occur with the use of high speed shafts that tend to have vibration, create heat and provide other adverse circumstances to continued and effective sealing.

We have, in the drawings and specification, presented a detailed disclosure of the preferred embodiments of our invention, but it is to be understood that we do not intend to limit the invention to the specific forms disclosed, but intend to cover all modifications, changes and alternative constructions and methods falling within the scope of the principles taught by our invention.

We claim as our invention:

A rotary seal comprising a rotating sealing ring adapted for rotational driving connection with a rotating shaft member and having a sealing surface, a mating annular sealing member fixed rotationally and having a sealing surface in engagement with the surface of the sealing ring, means holding said surfaces in sealing relationship to isolate zones along the shaft member and prevent operating fluid transferral, a stationary member having a first surface positioned adjacent the rotating sealing ring on the shaft member and a second surface adjacent said sealing surfaces and having a first passageway with an inlet opening in said first surface and an outlet opening in said second surface, said outlet opening being angularly circumferentially displaced from said inlet opening in the direction of rotation of the shaft member so that said passageway will receive fluid moving in the direction of shaft rotation, and a second passageway in said stationary member leading from said sealing surfaces for the removal of fluid flowing through said first passageway.

References Cited in the file of this patent

UNITED STATES PATENTS

| | | |
|---|---|---|
| 2,077,881 | Gits | Apr. 20, 1937 |
| 2,105,754 | Otis | Jan. 18, 1938 |
| 2,149,974 | McCormack | Mar. 7, 1939 |
| 2,429,953 | Bottomley | Oct. 28, 1947 |
| 2,432,684 | Rashong | Dec. 16, 1947 |
| 2,432,694 | Snyder | Dec. 16, 1947 |
| 2,480,506 | Payne | Aug. 30, 1949 |
| 2,598,886 | Brummer | June 3, 1952 |
| 2,622,905 | Heinrich | Dec. 23, 1952 |
| 2,706,652 | Berger | Apr. 19, 1955 |
| 2,757,052 | Spurgeon | July 31, 1956 |

FOREIGN PATENTS

| | | |
|---|---|---|
| 719,222 | Great Britain | Dec. 1, 1954 |
| 671,165 | Great Britain | Apr. 30, 1952 |
| 570,053 | Great Britain | June 20, 1945 |